Mar. 3, 1925. 1,528,112
C. L. JOHNSON
AUTOMOBILE TRANSMISSION LOCK
Filed March 22, 1922 2 Sheets-Sheet 1
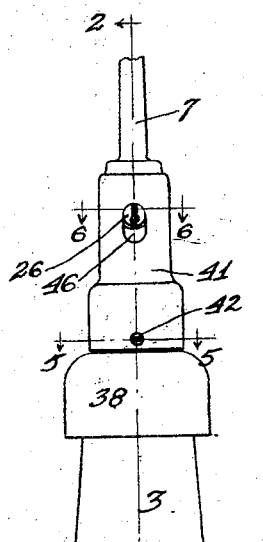
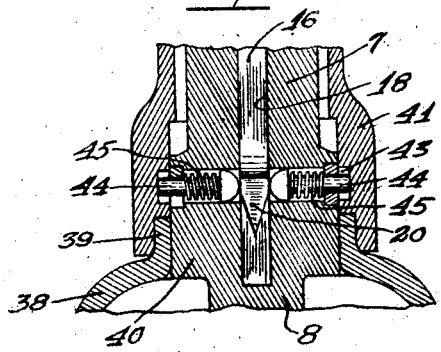
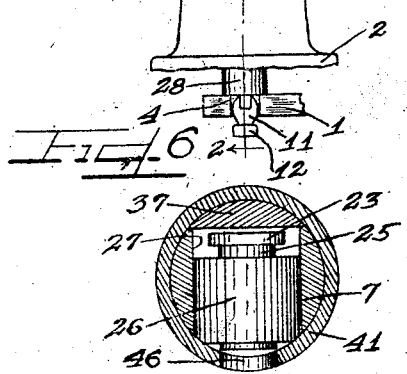
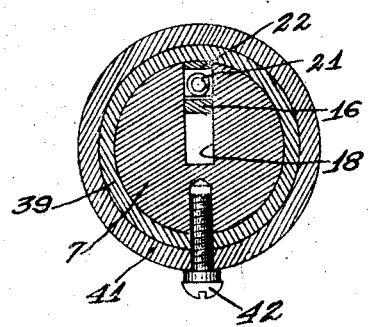
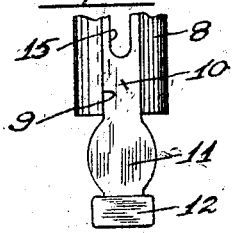
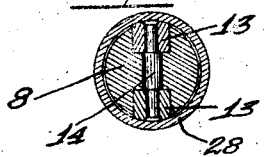

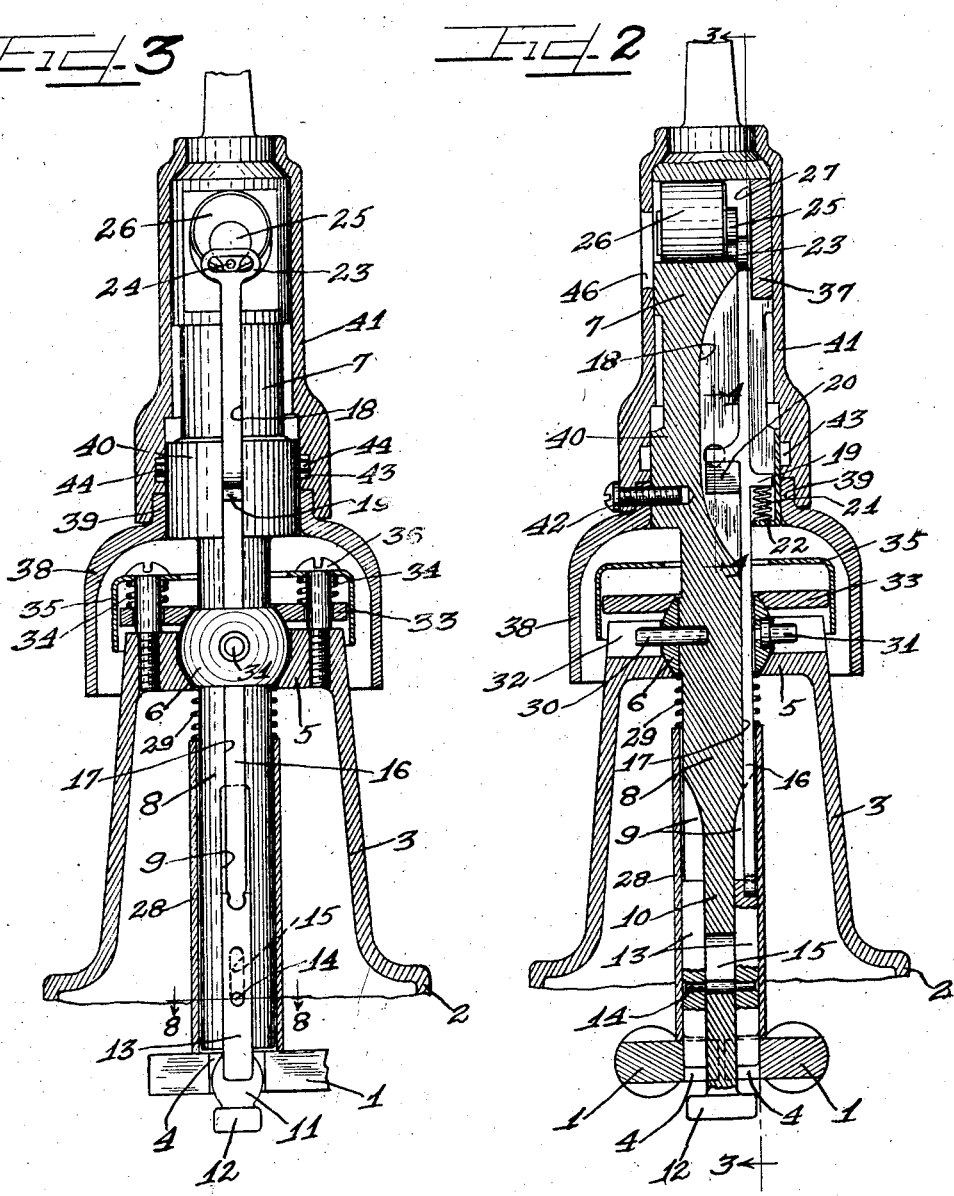

Patented Mar. 3, 1925.

1,528,112

UNITED STATES PATENT OFFICE.

COLVIN L. JOHNSON, OF ST. LOUIS, MISSOURI, ASSIGNOR TO JOHNSON AUTOMOBILE LOCK CO., A CORPORATION OF ILLINOIS.

AUTOMOBILE TRANSMISSION LOCK.

Application filed March 22, 1922. Serial No. 545,685.

*To all whom it may concern:*

Be it known that I, COLVIN L. JOHNSON, a citizen of the United States, and a resident of the city of St. Louis, in the county of St. Louis and State of Missouri, have invented certain new and useful Improvements in an Automobile Transmission Lock; and I do hereby declare that the following is a full, clear, and exact description of the same, reference being had to the accompanying drawings, and to the numerals of reference marked thereon, which form a part of this specification.

This invention relates to an improved type of a transmission lock wherein locking means, slidably engaged on the lower end of a longitudinally slotted gear shift lever for coaction with slidable notched transmission rods, are enclosed by a spring impelled sleeve engaged around the lower end of the gear shift lever below the pivot point thereof to prevent access to the locking means, the latch bar of which is protected by a connected hood and sleeve which are locked in place from the interior of the sleeve to prevent access to the locking mechanisms when the locking means is in lowered locking position to hold the gear shift lever locked against movement.

It is an object of this invention to provide a transmission lock wherein improved protecting mechanisms are provided for the locking members of a gear shift lever.

It is also an object of the invention to provide a transmission lock wherein a key operated latch bar and the locking members actuated thereby are adapted to be enclosed by sleeve members above and below the pivot point of the transmission gear shift lever to prevent access to the operating parts.

Another object of the invention is to provide a lower grooved end of a gear shift lever with a guard sleeve to prevent access to a pin connecting a pair of locking lugs adapted to be actuated by a key operated latch bar.

It is a further object of this invention to provide a slotted gear shift lever with improved guards above and below the pivot point thereof to prevent unauthorized tampering with locking members carried by the lever.

It is furthermore an object of the invention to provide a gear shift lever mechanism with a spring impelled upper socket member for holding the ball of the lever seated in a lower socket member.

Still another object of the invention is to provide a slotted gear shift lever with removable protecting members for enclosing a slidable latch bar, said protecting members adapted to be locked against removal when the latch bar is in lowered latching position.

It is an important object of this invention to provide a gear shift lever, having transmission locking means supported thereon, said locking means being protected by guards positioned on the lever above and below the ball of said lever.

Other and further important objects of this invention will be apparent from the disclosures in the specification and the accompanying drawings.

The invention (in a preferred form) is illustrated on the drawings and hereinafter more fully described.

On the drawings: Figure 1 is an elevation of a transmission control device embodying the principles of this invention.

Figure 2 is an enlarged vertical section taken on line 2—2 of Figure 1.

Figure 3 is a sectional view taken on line 3—3 of Figure 2.

Figure 4 is an enlarged fragmentary detail section taken on line 4—4 of Figure 2, showing parts in elevation.

Figure 5 is an enlarged transverse section taken on line 5—5 of Figure 1.

Figure 6 is an enlarged transverse section taken on line 6—6 of Figure 1, showing the lock in elevation.

Figure 7 is a fragmentary elevation of the lower end of the gear shift lever.

Figure 8 is a detail section taken on line 8—8 of Figure 3

As shown on the drawings: The reference numeral 1 indicates shiftable parallel transmission rods spaced apart and supported in an automobile transmission housing 2 having a housing or pedestal 3 formed thereon. The transmission rods 1 are notched as at 4. The upper end of the pedestal 3 is closed by a wall 5 having a curved opening therein affording a stationary seat or socket for the ball 6 of a gear shift lever 7. The tail piece 8 of the lever is enclosed by the pedestal 3 and has oppositely disposed grooves 9 cut in the lower portion thereof forming a vane 10 which extends downwardly in the form of a flattened disk or shift head 11 between the transmission rods 1. A head 12 is integrally formed on the lower end of the shift head 11 and serves as a means for preventing access to slidable locking bolts 13 engaged in the grooves 9. A pin 14 projects through a slot 15 in the lever vane 10 and serves to connect the two locking bolts 13.

Connected to one of the locking bolts 13 is the lower end of a latch bar 16. The latch bar 16 extends upwardly in a groove 17 in the lever tail piece 8 into a deeper groove 18 in the upper portion of the lever. Integrally formed on opposite sides of the latch bar 16 is a stop lug 19 and a tapered cam or wedge 20 which project into the groove 18 as illustrated in Figure 2. A coiled spring 21 is seated on an angle bracket 22 secured in the groove 18 of the lever. The upper end of said spring 21 presses against the latch bar lug 19. The upper end of the latch bar 16 has integrally formed thereon a slotted head or eye member 23 engaged on a pin 24 secured on a barrel 25 of a pin lock 26. The pin lock 26 is mounted in a chamber 27 formed in the lever 7 and is adapted to be actuated by means of a key to cause rotation of the lock barrel whereby the latch bar 16 may be lowered to move the locking bolts 13 into locking engagement in the notches 4 of the transmission rods 1.

Slidably engaged on the lever tail piece 8 is a guard sleeve 28 which is held resiliently against the rods 1 by a spring 29 coiled around the tail piece 8 between the ball 6 and the upper end of the guard sleeve 28. The sleeve 28 affords a protection for the locking bolts 13 and the connecting pin 14.

To prevent rotation of the gear shift lever 7, the ball 6 is provided with oppositely disposed projecting pins 30 and 31 which project into a groove 32 formed in the top wall 5 of the pedestal 3 as illustrated in Figure 2. An apertured upper socket member or plate 33 is engaged on the lever 7 above the ball 6 and is resiliently held against the ball 6 by means of coil springs 34. An apertured hood or cover 35 is engaged on the lever 7 above the socket plate 33 and encloses the ball and socket members. Screw bolts 36 project through openings in the hood, and through the springs 34 and the apertured socket plate 33 to permit the threaded ends of said bolts to engage in threaded openings in the top plate 5 of the pedestal 3. The springs 34 being disposed between the hood 35 and the upper socket plate 33 act to resiliently hold the plate 33 against the ball 6 thereby retaining the gear shift lever in operating position.

As shown in Figures 2 and 6, a block 37 is secured in the recessed portion of the gear shift lever to retain the slotted head 23 of the latch bar 16 engaged on the pin 24 of the pin lock 26.

Enclosing the ball and socket portions of the gear shift lever is a cap or hood 38 having a collar 39 which engages around an enlarged portion 40 of the gear shift lever. The latch bar mechanisms in the portion of the gear shift lever above the ball 6 are enclosed by means of a tubular casing or protecting sleeve 41, the lower end of which is enlarged and engages around the hood collar 39. A retaining screw 42 serves to hold the hood 38 and the casing 41 secured to the gear shift lever and to each other. The casing 41 is provided with an interior groove 43 to receive the ends of two oppositely disposed locking pins 44 mounted within a diametric passage in the enlarged portion 40 of the gear shift lever. Springs 45 are engaged on the locking pins 44 for normally holding the pins retracted with the rounded heads thereof contacting one another in the path of the tapered lever wedge 20 when the latch bar is in its elevated or release position to permit operation of the gear shift lever. The casing 41 is provided with an opening 46 to afford access to the key slot of the pin lock 26.

The operation is as follows: When the gear shift lever 7 is in neutral position the shift head 11 on the lower end thereof is positioned between the transmission rods 1 and the notches 4 therein. When the lever is to be operated the locking bolts 13 are in elevated release position. To shift the gears of a transmission a composite movement of the gear shift lever is necessary, that is, the lever must be thrown to one side and either forwardly or rearwardly for the purpose. The shift head 11 is thus moved into one of the notches 4. The forward or rearward movement of the lever will thus cause the engaged transmission rod to be shifted to effect a shifting of the gears of the transmission.

In the unlocked position of the gear shift lever the pin 24 of the pin lock 26 is in its uppermost position, thereby holding the latch bar 16 elevated with the locking bolts 13 out of engagement with the transmission rods 1. With the latch bar raised, the wedge 20 is also elevated to permit the springs 45 to hold the locking pins 44 retracted and free of the guard casing 41. It will thus be seen that when the lever is unlocked the guard casing 41 and the hood 38 may be easily released by removing the retaining screw 42. The casing 41 and the hood 38 may be shifted longitudinally on the gear shift lever to afford access to the operating parts of the lock. The spring 21 acting on the latch bar lug 19 serves to assist in raising the latch bar into release position when the pin lock 26 is unlocked by means of a key. With the screw 42 removed the hood 38 may be lifted so that access may be had to the screws 36 of the socket mechanism if desired.

To lock the gear shift lever 7 from movement, it is first moved into neutral position and by means of a key projected through the casing opening 46 and inserted into the pin lock 26, the barrel 25 is rotated. The pin 24 acting in the slot of the latch bar head 23 forces the latch bar 16 downwardly against the action of the spring 21 which is compressed. With the downward movement of the latch bar the wedge 20 thereon is forced downwardly between the rounded heads of the locking pins 44 as shown in Figure 4, thereby forcing said pins outwardly into the casing groove 43 against the action of the control springs 45 which are compressed. It will thus be noted that when the latch bar is lowered into locking position, that the locking pins 44 serve to lock the guard casing 41 and the hood 38 from the inside against longitudinal movement on the gear shift lever even when the retaining screw 42 is removed. Access to the operating parts of the transmission lock cannot be had by shifting the guard casing 41 and the hood 38 when the latch bar is in lowered locking position.

When the latch bar is lowered the locking bolts 13 are simultaneously pushed downwardly to engage in the notches 4 of the transmission rods 1 as illustrated in Figures 1 and 2, thereby locking the gear shift lever in neutral position and preventing the same from being thrown sideways to engage the shift head 11 in one of the transmission rod notches 4. The transmission is thus locked against operation with the head 12 on the lower end of the gear shift rod positioned to prevent access to the pin 14 so that the same cannot be cut from below to release one of the locking bolts 13 and thereby permit operation of one of the transmission rods. The guard sleeve 28 acts as a protection for the pin 14 from above the transmission rods. The sleeve 28 cannot be raised against the action of the spring 29 a distance sufficient to expose the pin 14 so that the pin cannot be cut or released by unauthorized persons.

In the construction of some types of automobiles the gear shift lever supporting pedestal or housing 3 is mounted on the floor of the car and is separated from the top of the transmission case or housing thereby leaving a portion of the lower end of the gear shift lever unprotected between the floor and the transmission case. The guard sleeve 28 provided in this patent serves to properly enclose the locking members engaged on the tail piece of the gear shift lever and prevents access thereto from below the floor of the car.

I am aware that numerous details of construction may be varied through a wide range without departing from the principles of this invention, and I therefore do not purpose limiting the patent granted otherwise than necessitated by the prior art.

I claim as my invention:

1. The combination with a gear shift lever, of slidable locking members therein, a locking mechanism on said lever, a bar in said lever connected to said locking mechanism, a wedge member integrally formed on said bar, and means for operating said bar to cause the same to move the locking mechanism into locking position and simultaneously cause said wedge member to project said locking members into locking position.

2. The combination with a gear shift lever, of a locking mechanism therein, a hood engaged around said lever, a guard casing also engaged around said lever and connected with said hood, exteriorly accessible means for securing both the hood and casing to said lever to enclose the locking mechanism, and interior locking means in said lever adapted to be moved into locking engagement with said casing when the locking mechanism is moved into locking position.

3. The combination with a gear shift lever and the supporting housing thereof, of means on said housing for holding the lever in place, a hood on said lever engaging over said retaining means, a locking mechanism in said lever, a casing on said lever enclosing said locking mechanism, exterior means for securing the hood and casing to said lever, and interior means in said lever adapted to be moved into position to lock said hood and casing to said lever from the interior when said locking mechanism is moved into locking position.

4. The combination with a gear shift lever and the supporting housing thereof, of retaining means secured to said housing for resiliently holding the lever in place, a lever locking mechanism in said lever, an interfitting hood and casing on said lever for enclosing the retaining means and said locking mechanism, exterior means for securing said hood and casing to said lever, interior members in said lever inaccessible from the exterior of the hood and casing, and wedge means forming a part of said locking mechanism adapted to be projected between said interior members to force the same apart and into position to lock said hood and casing to said lever from the interior when said locking mechanism is moved into locking position to lock the lever.

5. The combination with a slotted gear shift lever, of a locking means thereon, spring impelled pins in said lever, key operated means in said lever, a latch bar slidable in the slotted lever connected with said key operated means and with said lever locking means, a tapered member integrally formed on said latch bar, a lug formed on said latch bar, a spring in said lever engaging said lug for holding the latch bar in release position, a plurality of guard members on said lever for enclosing the operating mechanisms in the lever, and exterior means for securing the guard members to the lever, said latch bar adapted to be operated by said key operated means to move said lever locking means into locking position and at the same time force the tapered member between said spring impelled pins to force the same apart into a position for securing the guard member to said lever from the interior when the lever is locked.

6. The combination with a gear shift lever and the locking means thereof, of interfitting guards thereon, means for securing said guards to the lever from the exterior, and spring controlled slidable pins in said lever adapted to be moved in opposite directions to hold said guards secured to the lever from the interior when the lever locking means is moved into locking position.

7. The combination with a gear shift lever, of a plurality of interfitting guard members thereon, spring controlled slidable pins for securing said guard members to said lever from the interior, and a wedge slidable in the lever for acuating said pins.

8. A gear shift lever mechanism comprising a supporting housing, a socket member formed thereon, a gear shift lever projecting into the housing, a ball formed thereon seated in said socket member, a second socket member above said ball, a cap enclosing the same and the upper portion of the housing, screws connecting said cap with said housing, and springs on said screws between the cap and said second socket member for holding the second socket member against the ball thereby holding the lever in operating position.

9. A gear shift lever mechanism comprising a supporting housing, a gear shift lever projecting into the housing, a ball thereon, a spring controlled socket plate above said housing engaging said ball for holding the lever in operating position, guard members on said lever above the ball, and a spring-impelled guard sleeve on said lever below the ball.

10. A gear shift lever mechanism comprising a supporting housing, a gear shift lever projecting into the housing, a ball thereon, a socket for receiving the ball, interfitting guard members on said lever above the ball, and a spring impelled guard sleeve on said lever below the ball.

11. A gear shift lever mechanism comprising a supporting housing, a gear shift lever projecting into the housing, a ball thereon, a socket on said housing for receiving the ball, interfitting guard members on said lever above said ball, means for securing said guard members to said lever from the exterior and from the interior of said guard members, a lower guard member engaged on said lever below the ball, and resilient means on said lever for holding the lower guard member in position.

12. The combination with a gear shift lever and the supporting means thereof, of a plurality of guard members secured to said lever above the supporting means, and a spring impelled guard member on said lever within the supporting means.

13. The combination with a gear shift lever, of a guard sleeve slidable on the lower end of said lever, and a spring coiled around the lever for holding the guard sleeve in position.

14. The combination with a gear shift lever, of a guard member on the lower end thereof, and a spring for holding the guard member in position to protect the lower portion of said lever.

15. The combination with a gear shift lever, of locking means therefor, a guard on said lever below the pivot point thereof for protecting said locking means, and means for resiliently holding said guard in place.

16. The combination with a gear shift lever and the support therefor, of a ball lever projecting into the support and supported thereby, locking means on the lever below the support for locking the lever against operation, a sleeve on the lower portion of said lever to enclose and guard said locking means, and a spring engaged on said lever and contacting said sleeve to resiliently hold the sleeve in guarding position.

17. The combination with a gear shift lever supporting housing, of a gear shift lever projecting therethrough, locking means on said gear shift lever below the supporting housing, a sleeve on the lower portion of said lever to protect said locking means, a spring for holding said sleeve in place, and means formed on the lower end of said gear shift lever to prevent access to said locking means from below the sleeve.

18. A supporting housing, a gear shift lever projecting therein, means on said housing for resiliently holding the gear shift lever in position, locking means on the lever within said housing, a latch bar slidable in said lever and connected to said locking means and projecting above the housing, key operated means in said lever above the housing for operating said latch bar to cause the same to move the locking means into locking position, a hood and a casing on said lever above the housing to protect the key operated means, the latch bar and the means for resiliently holding the gear shift lever in position, exteriorly accessible means for securing the hood and casing to said lever, a wedge formed on said gear shift lever, interior locking members adapted to be actuated by said wedge to secure said hood and casing to the lever when the latch bar is actuated to cause locking of the lever, a sleeve on the lower portion of said lever to protect the lever locking means, a spring for holding the sleeve in protecting position, and a guard formed on the lower end of said lever below the sleeve to prevent access to the lever locking means through the lower end of said sleeve.

19. The combination with a gear shift lever and the locking means thereof, of a guard sleeve slidably engaged on the lever to enclose the locking means, a spring for holding the guard sleeve in guarding position, and a guard member formed on the lower end of said lever below the sleeve.

20. The combination with a supporting housing, a gear shift lever projecting into the housing, a ball on said lever, a socket for receiving the ball, guards on said lever above the ball, a guard sleeve slidably engaged on said lever below the ball, and means for holding the guard sleeve in position.

In testimony whereof I have hereunto subscribed my name in the presence of two subscribing witnesses.

COLVIN L. JOHNSON.

Witnesses:
CARLTON HILL,
FRED E. PAISLER.